Sept. 7, 1954     O. WITTEL ET AL     2,688,389
CLUTCH MECHANISM
Filed Dec. 14, 1950
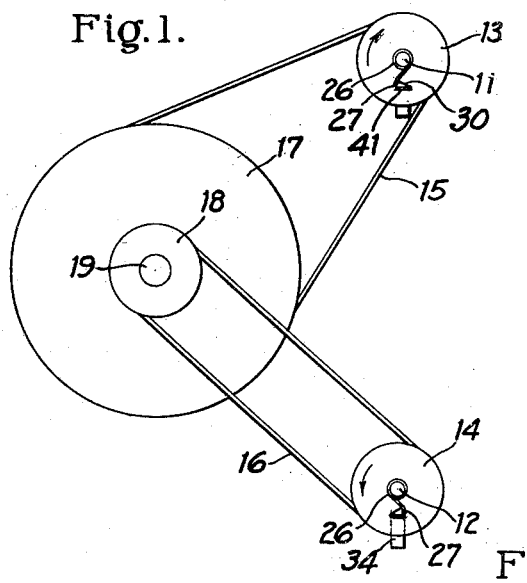
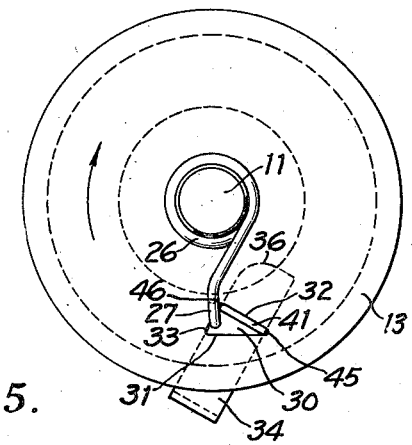
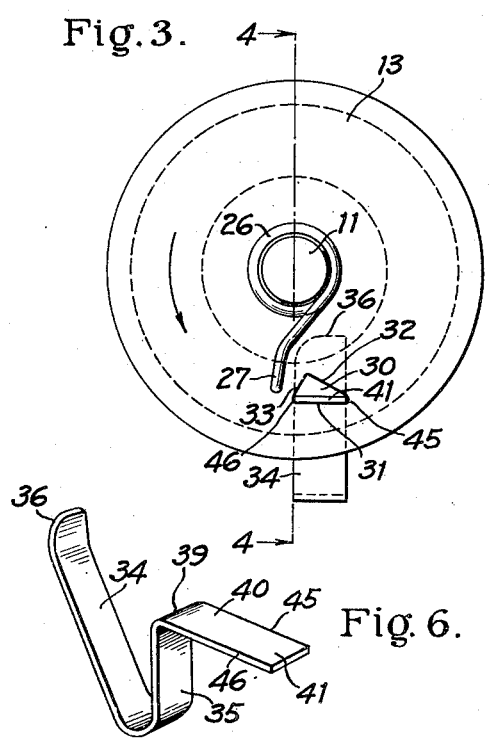
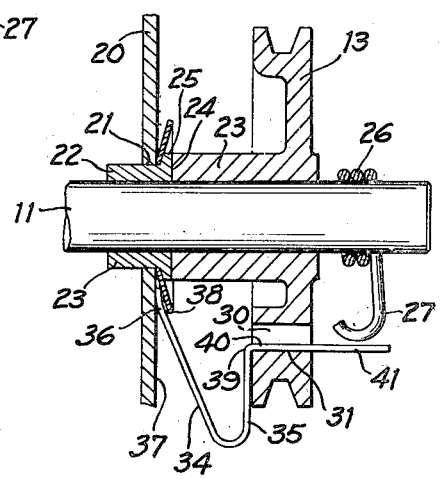
Otto Wittel
George Wittel
Inventors
By Daniel J. Mayne
J. Griffin Little
Attorneys Patented Sept. 7, 1954

2,688,389

UNITED STATES PATENT OFFICE 2,688,389

CLUTCH MECHANISM

Otto Wittel and George Wittel, Rochester, N. Y., assignors to Eastman Kodak Company, Rochester, N. Y., a corporation of New Jersey Application December 14, 1950, Serial No. 200,792

10 Claims. (Cl. 192—41)

The present invention relates to clutches, and more particularly to a clutch designed primarily, although not necessarily, to drive selectively the take-up and supply shafts of a motion picture projector.

As is common practice, motion picture projectors are provided with a pair of reel spindles or shafts positioned on opposite sides of the film gate, and adapted to receive film reels. These spindles are connected, through suitable clutch mechanisms, to the main drive shaft of the projector so that the spindles may be driven selectively and in the proper direction. During normal projection, the lower or take-up spindle is driven to wind up the projected film, while the upper or supply spindle idles. However, during reversing or rewinding, the lower spindle is disconnected and idles, and the upper spindle is connected to the main drive so as to wind the film back onto the reel positioned on the upper or supply spindle. Thus, the spindles are individually and selectively connected to the drive means of the projector so that the proper spindle may be driven.

In the present invention, each reel spindle or shaft has loosely mounted thereon a pulley which is connected by a suitable drive belt to the main drive shaft of the projector. Each pulley and its supporting shaft is provided with cooperating clutch elements which become operative when the pulley is rotated in one direction to connect the pulley automatically to its supporting shaft to drive the latter from its pulley. However, the rotation of the pulley in the opposite direction serves to disengage the clutch automatically to free or disconnect the pulley from the shaft so that the latter idles. Thus, the direction of rotation of each pulley determines the connecting and disconnecting of the pulley to and from its supporting shaft.

The present invention has as its principal object the provision of a new and simplified clutch arrangement.

A further object of the invention is the provision of a clutch which is engaged or disengaged automatically, depending upon the direction of rotation of the pulley carried by the shaft.

Yet another object of the invention is the provision of a clutch which is formed of few parts of rugged construction, simple, positive in its action, and highly effective in use.

To these and other ends, the invention resides in certain improvements and combinations of parts, all as will be hereinafter more fully described, the novel features being pointed out in the claims at the end of the specification.

In the drawings:

Fig. 1 is a side elevation view of a part of the mechanism of a motion picture projector, showing the relation of the reel spindles or shafts to the main drive shaft of the projector;

Fig. 2 is an end elevation view of the upper or supply spindle with its associated drive pulley, showing the clutch parts in their engaged relation to connect the spindle to the pulley so as to be driven or rotated thereby;

Fig. 3 is a view similar to Fig. 2, but showing the clutch parts in a disengaged relation to disconnect the spindle from the pulley so that the spindle may idle;

Fig. 4 is a vertical sectional view taken substantially on line 4—4 of Fig. 3, showing the relation of the clutch parts to the drive pulley and its supporting shaft or spindle;

Fig. 5 is a perspective view of the coil spring clutch member or element which is loosely mounted on the spindle to form one of the clutch elements; and Fig. 6 is a perspective view of a flat spring strip ratchet, showing the relation of the various parts thereof.

Similar reference numerals throughout the various views indicate the same parts.

As the present invention relates only to a clutch for connecting a drive pulley to a supporting shaft, only so much of the projector mechanism as is necessary to a full understanding of the present invention is described and disclosed. The other features of the projector may be of any suitable and well known construction and form no part of the present invention.

Fig. 1 of the drawings shows an upper supply spindle 11 and a lower take-up spindle 12 on which are mounted loosely the pulleys 13 and 14 respectively. These pulleys are connected by belts 15 and 16 to pulleys 17 and 18 respectively, which are mounted on the main drive shaft 19 of the projector. As the pulleys 13 and 14 provide the means by which the spindles or shafts are driven, these pulleys may be designated broadly as drive pulleys. As the two spindle and pulley structures, as well as the clutch mechanisms associated with each spindle, are identical in structure, only one clutch will be described, and corresponding parts in the other clutch mechanism will be designated by the same numerals.

Fig. 4 of the drawings shows a portion 20 of the machine frame formed with an opening 21 in which is positioned a bushing or sleeve 22 through which the spindle 11 extends. The pulley 13 is provided with a sleeve or hub 23 for loosely mounting the pulley on its supporting spindle or shaft 11. The inner end 24 of the hub 23 engages an annular flange 25 formed on bushing 22 to limit inward movement of the pulley relative to its supporting shaft 11, as shown in Fig. 4. A coil spring 26 is mounted on the opposite side, right side Fig. 4, of pulley 13, and serves to retain the pulley against rightward axial movement on the shaft 11. The two coil springs 26 on the shafts 11 and 12 are wound in opposite directions, as shown in Fig. 1, so that they will grip their supporting shafts 11 and 12 tightly and frictionally, in a manner and for a purpose to be later described. The outer end portion of each spring 26 is formed with a depending tailpiece 27 which projects radially from the shaft, as shown in Figs. 1 and 5.

Each pulley, 13 and 14, has formed therein an axially extending opening 30 which projects through the pulley and is spaced radially from its supporting shaft, as best shown in Fig. 4. The opening 30 is substantially triangular in shape, see Figs. 2 and 3, and is formed with a base 31 and opposite inclined sides 32 and 33. The opening 30 in the two pulleys is of opposite configuration, as shown in Fig. 1, for reasons to be later described.

A ratchet is formed from a thin strip of material such, for example, as spring metal, to provide a U-shaped portion having a long leg 34 and a shorter leg 35. The free end 36 of the leg 34 is bent and engages the surface 37 of the frame 20. In order to insure proper frictional engagement of end 36 with surface 37, a washer 38 is positioned behind the flange 25 and overlies the end 36 of leg 34 to retain the end against surface 37, as best shown in Fig. 4. The free end of leg 35 is bent at 39 to provide an axially extending member or portion 40 which projects through opening 30 and normally lies on the base 31 of the opening 30, as shown in Fig. 3. The free end of the member 40 projects beyond the pulley 13 to provide a tail-engaging section 41 which is positioned in substantially radial alignment with and slightly below the tailpiece 27, as shown in Figs. 3 and 4. It is apparent that by reason of the position of portion 40 in the opening 30, the ratchet will rotate as a unit with the pulley. Such rotation will cause the end 36 to slide or drag on the surface 37. Therefore, the U-shaped portion of the ratchet with its bent end 36 may be broadly designated as a drag link.

With the above parts in mind, the operation of the clutch will now be described:

During normal projection, the lower pulley 14 is driven in a counter-clockwise direction and the clutch associated therewith connects the pulley 14 to shaft 12 to drive the latter as a unit with its pulley. At this time the upper pulley 30 is similarly rotated, but the clutch associated therewith is disconnected and the upper shaft idles, as illustrated in Fig. 3. Figs. 2 and 3 show the upper pulley 13 and its shaft 11 and the associated clutch parts. As mentioned above, during normal projection the upper pulley 30 will rotate in a counter-clockwise direction, as indicated by the arrow in Fig. 3. This rotation of the pulley 13 will cause the end 36 of leg 34 to drag or slide on the surface 37. This frictional contact between the end 36 and surface 37 will serve to rock portion 40 in a counter-clockwise direction about its right edge 45 on the base 31 of opening 30 to cause the portion 40 to engage and lie flat against base 31, as illustrated in Fig. 3. In this position, the portion 40 is out of the path of the tailpiece 27 of the spring 26 and the shaft 11 will not be driven. It is apparent that the base 31 limits such counter-clockwise rocking movement of the portion 40, and the base then constitutes a stop or limiting means for the portion, as is deemed apparent.

However, during reversing or rewinding, the pulley 13 will be rotated in a clockwise direction, as indicated by the arrow in Fig. 2. As the ratchet is carried by the pulley 13 it moves as a unit therewith. Such movement will cause end 36 of leg 34 to drag on surface 37 with sufficient force as to impart a clockwise rocking movement of portion 40 to cause the latter to rock about the edge 45 until portion 40 finally engages side 32 of the triangular opening 30 to limit further movement of the portion 40 relative to pulley 13. Thus, sides 31 and 32 of the opening 30 constitute limiting means for portion 40. As the pulley continues to rotate, the ratchet moves therewith, and the portion 40 is held against side 32 of the opening 30. In this position, the opposite edge 46 of the portion 40 has been moved into the path of the tailpiece 27 so that as the pulley continues to rotate, the edge 46 will finally engage tailpiece 27 as shown in Fig. 2. Further rotation of the pulley will cause edge 46 to move the tailpiece 27 slightly to the left, Fig. 2, to wind up the coil spring 26, so that the latter will grip shaft 11 to connect the latter to pulley 13 to rotate as a unit therewith. Further movement of the pulley 13 will then carry the shaft 11 therewith so that the pulley and shaft will rotate in unison. Thus, counter-clockwise rotation of pulley 13 will serve to rock portion 40 to the position shown in Fig. 3 to disconnect shaft 11 from pulley 13, but clockwise rotation of pulley 13 will rock portion 40 to the position shown in Fig. 2 to engage the tailpiece 27 to connect shaft 11 in driven relation with the pulley 13 to drive the spindle or shaft 11.

The spring 26 on the lower shaft 12 is wound in the opposite direction to that of the upper spring, see Fig. 1, and the lower opening 30 is shaped opposite that of opening 30 of the upper pulley 13. The result is that the counter-clockwise rotation of pulley 14 will serve to engage the lower clutch to connect shaft 12 to pulley 14, while the clockwise rotation of pulley 14 will disengage the lower clutch to free the shaft 12 so the latter may idle. Thus, the two clutch mechanisms are so arranged that only one shaft at a time will be connected to its drive pulley so the shafts will be driven selectively and in proper direction. Thus, the present invention provides simple, rugged, positive clutch mechanisms which will connect the shafts automatically and selectively to the drive pulleys supported thereon to drive the shafts in proper sequence and in the proper direction.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

What we claim and desire to secure by Letters Patent of the United States is:

1. A clutch mechanism comprising, in combination, a shaft, a drive pulley loosely mounted on said shaft, means including a coil spring mounted on said shaft to position the pulley axially on said shaft, a ratchet rockably mounted in said pulley, and means for rocking said ratchet relative to said pulley when the latter is rotated in one direction to move said ratchet into engagement with said spring to wind the latter into engaging relation with said shaft to connect the latter to said pulley, said means also rocking said ratchet relative to pulley when the latter is rotated in the opposite direction to disengage said ratchet from said spring to declutch said pulley from said shaft.

2. A clutch mechanism comprising, in combination, a shaft, a drive pulley loosely mounted on said shaft, a coil spring clutch member carried by said shaft adjacent said pulley, a radially extending tail formed on said spring, a ratchet loosely carried by said pulley, and means for moving said ratchet relative to said pulley when the latter is rotated in one direction to engage said ratchet with said tail to wind the spring into engaging relation with said shaft to connect the latter in driven relation with said pulley, said means moving said ratchet out of engagement with said tail to disconnect said shaft when said pulley is rotated in the opposite direction.

3. A clutch mechanism comprising, in combination, a shaft, a drive pulley loosely mounted on said shaft, a coil spring clutch member carried by said shaft adjacent said pulley, a radially extending tail formed on said spring, said pulley being formed with an axially extending opening spaced radially from said shaft, a flat strip member loosely positioned in said opening, and means for rocking said strip to one position to engage said tail to wind said spring into engaging relation with said shaft to clutch the latter to said pulley when the latter is rotated in one direction, said means rocking said strip to another position and out of engagement with said tail to disconnect said shaft from said pulley when the latter is rotated in the opposite direction.

4. A clutch mechanism comprising, in combination, a shaft, a drive pulley loosely mounted on said shaft, a coil spring clutch member carried by said shaft adjacent said pulley, said pulley being formed with an axially extending opening spaced radially from said shaft, a flat strip loosely positioned in said opening and formed with a portion extending laterally from the pulley adjacent said spring, and means for rocking said strip relative to said pulley to one position to engage said portion with said spring to wind said spring into gripping relation with said shaft when said pulley is rotated in one direction to clutch the shaft to said pulley to rotate therewith, said means rocking said strip relative to said pulley to another position to move said portion out of engagement with said spring to disconnect the shaft completely from said pulley when the latter is rotated in the opposite direction.

5. A clutch mechanism comprising, in combination, a drive pulley loosely mounted on said shaft, a coil spring clutch member carried by said shaft adjacent said pulley, said pulley being formed with an axially extending opening spaced radially from said shaft, a flat strip loosely positioned in said opening and formed with a portion extending laterally from the pulley adjacent said spring, and means for rocking said strip about one edge in said opening when said pulley is rotated in one direction to bring the opposite edge of said portion into engagement with said spring to wind the latter into gripping relation with said shaft to clutch the latter to the pulley for rotation therewith, said means rocking said strip about said one edge to move said opposite edge of said portion out of engagement with said spring when said pulley is rotated in the other direction to disconnect said pulley from said shaft.

6. A clutch mechanism comprising, in combination, a fixed support, a shaft mounted for rotation in said support, a drive pulley loosely mounted on said shaft, a clutch element positioned on said shaft adjacent one side of said pulley, said pulley being formed with an axially extending opening spaced radially from said shaft, a ratchet member comprising a drag link frictionally engaging said support, and a flat strip section of said ratchet extending through said opening and projecting beyond said one side of said pulley, the rotation of said pulley in one direction causing said link to engage said support to rock said ratchet in one direction relative to said pulley to bring said section into driving relation with said element to connect said pulley to said shaft, the rotation of said pulley in the opposite direction causing said link to engage said support to rock said ratchet in the opposite direction relative to said pulley to disconnect said section from said element to declutch said pulley from said shaft.

7. A clutch mechanism comprising in combination a fixed support, a shaft mounted for rotation in said support, a drive pulley loosely mounted on said shaft, a coil spring mounted on said shaft adjacent one side of said pulley and serving to retain the pulley in axial position on said shaft, said pulley having an axially extending opening extending therethrough and positioned radially from said shaft, a flat spring strip ratchet member extending through and loosely positioned in said opening and formed with an axially extending portion projecting laterally from said one side of said pulley, and a U-shaped drag link formed on said ratchet and having a leg thereof frictionally engaging said support, the rotation of said pulley in one direction serving to cause said leg to slide on said support to rock said strip about one edge in said opening to move the opposite edge of said portion into engagement with said coil spring to wind the latter into gripping relation with said shaft to clutch the latter to said pulley, the rotation of said pulley in the opposite direction causing said link to engage said support frictionally to rock said ratchet about said one edge relative to said pulley to move said opposite edge of said portion out of engaging relation with said coil spring to disconnect said pulley from said shaft.

8. A clutch mechanism comprising, in combination, a fixed support, a shaft mounted for rotation in said support, a drive pulley loosely mounted on said shaft, a coil spring mounted on said shaft adjacent one side of said pulley and serving to retain the pulley in axial position on said shaft, said spring having a radially extending tailpiece, said pulley being formed with an axially extending opening spaced radially from said shaft, a ratchet in the form of a flat spring strip loosely positioned in said opening and having a portion projecting from one side of said pulley and in radial alignment with said tailpiece, and a U-shaped drag link formed on said ratchet and positioned relative to said pulley so that one leg of said link will engage said support frictionally so that when said pulley is rotated in one direction the frictional engagement of said one leg on said support will rock said strip about one edge in said opening to move the other edge of said portion into engagement with said tailpiece to wind said spring into gripping relation with said shaft to connect the latter in driven relation with said pulley, the engagement of said one leg with said support also serving to rock said strip in the opposite direction about said one edge to move the other edge of said portion out of engagement with said tailpiece to disconnect said shaft from said pulley when the latter is rotated in the opposite direction.

9. A clutch mechanism comprising, in combination, a shaft, a drive pulley loosely mounted on said shaft, a coil spring clutch member carried by said shaft adjacent said pulley, said pulley being formed with an axially extending opening spaced radially from said shaft, a flat strip loosely positioned in said opening and formed with a portion extending laterally from the pulley adjacent said spring, means for rocking said strip about one edge in said opening when said pulley is rotated in one direction to bring the opposite edge of said portion into engagement with said spring to wind the latter into gripping relation with said shaft to clutch the latter to the pulley for rotation therewith, said means rocking said strip about said one edge to move said opposite edge of said portion out of engagement with said spring when said pulley is rotated in the other direction to disconnect said pulley from said shaft, and means on said pulley for limiting the rocking movement of said strip.

10. A clutch mechanism comprising, in combination, a shaft, a drive pulley loosely mounted on said shaft, a clutch element positioned on said shaft, said pulley being formed with an axially extending opening spaced radially from said shaft, said opening being substantially triangular in radial section and having a flat base the plane of which is substantially parallel to the axis of said shaft, said opening having inclined sides, a flat strip ratchet member positioned in said opening, a portion on said member projecting axially from one side of said pulley, means operative upon rotation of said pulley in one direction for rocking said strip in one direction about one edge thereof in said opening to move the opposite edge of said portion into cooperating relation with said element to connect said pulley to said shaft, means operative upon rotation of said pulley in the opposite direction to rock said strip about said one edge in the opposite direction to move the opposite edge of said portion out of cooperating relation with said element to disconnect said pulley from said shaft, and means for limiting the rocking movement of said strip in said opening.

References Cited in the file of this patent

UNITED STATES PATENTS

| Number | Name | Date |
| --- | --- | --- |
| 1,126,374 | Breth | Jan. 26, 1915 |
| 1,396,343 | Richardson | Nov. 8, 1921 |
| 2,121,547 | Love | June 21, 1938 |
| 2,276,430 | Stechbart | Mar. 17, 1942 |